United States Patent
Han et al.

(10) Patent No.: US 7,974,214 B2
(45) Date of Patent: Jul. 5, 2011

(54) METHOD AND APPARATUS FOR CLASSIFYING TRAFFIC AT TRANSPORT LAYER

(75) Inventors: Young Tae Han, Seongnam-Si (KR); Hong Shik Park, Daejeon (KR)

(73) Assignee: ICU Research and Industrial Group, Daejeon (KR)

( * ) Notice: Subject to any disclaimer, the term of this patent is extended or adjusted under 35 U.S.C. 154(b) by 161 days.

(21) Appl. No.: 12/423,578

(22) Filed: Apr. 14, 2009

(65) Prior Publication Data

US 2010/0124182 A1      May 20, 2010

(30) Foreign Application Priority Data

Nov. 17, 2008   (KR) .................. 10-2008-0114206

(51) Int. Cl.
*H04L 12/26* (2006.01)

(52) U.S. Cl. ..................... 370/252; 709/231; 707/3

(58) Field of Classification Search .................. 370/252, 370/253; 709/231; 703/3
See application file for complete search history.

(56) References Cited

U.S. PATENT DOCUMENTS

| | | | |
|---|---|---|---|
| 2005/0060295 A1* | 3/2005 | Gould et al. | 707/3 |
| 2009/0279443 A1* | 11/2009 | Kim et al. | 370/252 |
| 2010/0217886 A1* | 8/2010 | Seren et al. | 709/231 |

* cited by examiner

*Primary Examiner* — Albert T Chou
(74) *Attorney, Agent, or Firm* — The Webb Law Firm

(57) ABSTRACT

Provided is a method and apparatus for classifying applications in traffic easily and accurately by utilizing only statistical data of traffic at transport layer. A method of the present invention includes determining candidate applications by comparing at least one of smallest packet size, biggest packet size and average packet size of collected packets for a flow with corresponding reference data of potential applications; and comparing mode set of packet size for the collected packets with corresponding reference data of the candidate applications to identify the flow as an application which has identical elements in the same order, the number of the identical elements being equal to or more than a predetermined number.

16 Claims, 7 Drawing Sheets

METHOD AND APPARATUS FOR CLASSIFYING TRAFFIC AT TRANSPORT LAYER

BACKGROUND OF THE INVENTION

1. Field of the Invention

The present invention relates to a method and apparatus for classifying traffic at transport layer, and more particularly, to a method and apparatus for classifying traffic easily and also accurately by identifying the application service of traffic with only statistical data of traffic at transport layer.

2. Description of the Related Art

Recent explosive development of internet over decades has brought about dramatic development of traffic. Accordingly, classifying and analyzing traffic has been an important issue for providing resources and developing applications.

Typical two methods to classify traffic are a port number based method and a payload content based method. Traditionally, identification of application has been carried out by a port number since most of applications use static port numbers. However, many of new P2P applications allot random port numbers. Furthermore, many of existing applications using a C&S model tend to allot random port numbers. The random allotment complicates identifying applications by port numbers.

According to the content based method, the whole or specific part of payload content is examined to identify applications. This method identifies applications accurately. However, this method requires a big storage and is complicated in finding a signature and mapping. At the same time, this method has problems in scalability and protecting contents. If there is no signature or if data are encrypted, the method cannot identify applications, even if there are enough resources. For example, in case of game services, most of game protocols are not open to the public, so that it is difficult to find a signature of the relevant application. Therefore it is difficult to identify game applications by the content based method.

SUMMARY OF THE INVENTION

An object of the present invention is to carry out classifying traffic more accurately than the present port number based method, and faster and more simply than the present payload content based method.

Another object of the present invention is to carry out classifying traffic accurately only by using the limited characteristics of traffic and the limited number of packets, with maintaining complexity low.

The objects of the present invention are not limited by the aforementioned objects and other objects not mentioned and advantages of the present invention will be understood by the following description and will be understood more accurately by the exemplary embodiments of the present invention. In addition, the objects and advantages of the present invention can be realized by the means and their verification shown in claims.

In one aspect of the invention, there is provided a method for classifying traffic at transport layer, comprising: determining candidate applications by comparing at least one of smallest packet size, biggest packet size and average packet size of collected packets for a flow with corresponding reference data of potential applications; and comparing mode set of packet size for the collected packets with corresponding reference data of the candidate applications to identify the flow as an application which has identical elements in the same order, the number of the identical elements being equal to or more than a predetermined number.

In further aspect of the invention, there is provided a method for classifying traffic at transport layer, comprising: collecting reference data regarding a mode set of packet size of candidate applications; and comparing a mode set of packet size of collected packets for a flow and those of the candidate applications to identify the flow as an application which has identical elements in the same order, the number of the identical elements being equal to or more than a predetermined number.

In still further aspect of the invention, there is provided a method for classifying traffic at transport layer, comprising: collecting reference data regarding packet size distributions of candidate applications; calculating correlation coefficients between packet size distribution for collected packets of a flow and the reference data of the candidate applications; and identifying the flow as an application which has the biggest correlation coefficient.

In still further aspect of the invention, there is provided an apparatus for classifying traffic at transport layer, comprising: a packet collection section for collecting packets of a flow; a reference data storage section for storing reference data regarding smallest packet size, biggest packet size, average packet size and mode set of packet size for potential applications; a candidate application determination section for determining candidate applications by comparing at least one of smallest packet size, biggest packet size and average packet size of packets collected in the packet collection section with the corresponding reference data for the potential applications stored in the reference data storage section; and a final application determination section for comparing mode set of packet size for the collected packets with the corresponding reference data of the candidate applications to identify the flow as an application which has identical elements in the same order, the number of the identical elements being equal to or more than a predetermined number.

In still further aspect of the invention, there is provided an apparatus for classifying traffic at transport layer, comprising: a packet collection section for collecting packets of a flow; a reference data storage section for storing reference data regarding mode set of packet size for candidate applications; and an application determination section for comparing mode set of packet size for the collected packets with the reference data of the candidate applications to identify the flow as an application which has identical elements in the same order, the number of the identical elements being equal to or more than a predetermined number.

In still further aspect of the invention, there is provided an apparatus for classifying traffic at transport layer, comprising: a packet collection section for collecting packets of a flow; a reference data storage section for storing reference data regarding packet size distribution of candidate applications; an application determination section for calculating correlation coefficients between packet size distribution for the collected packets and packet size distributions of the candidate applications to identify the flow as an application which has the biggest correlation coefficient.

According to the present invention, a classification of traffic can be carried out more accurately than the current port number based method, and faster and less complicated than the current payload content based method. In addition, an accurate classification of traffic can be carried out only by using the limited characteristics of traffic and the limited number of packets, with maintaining complexity low.

DETAILED DESCRIPTION OF THE INVENTION

Figure 1:
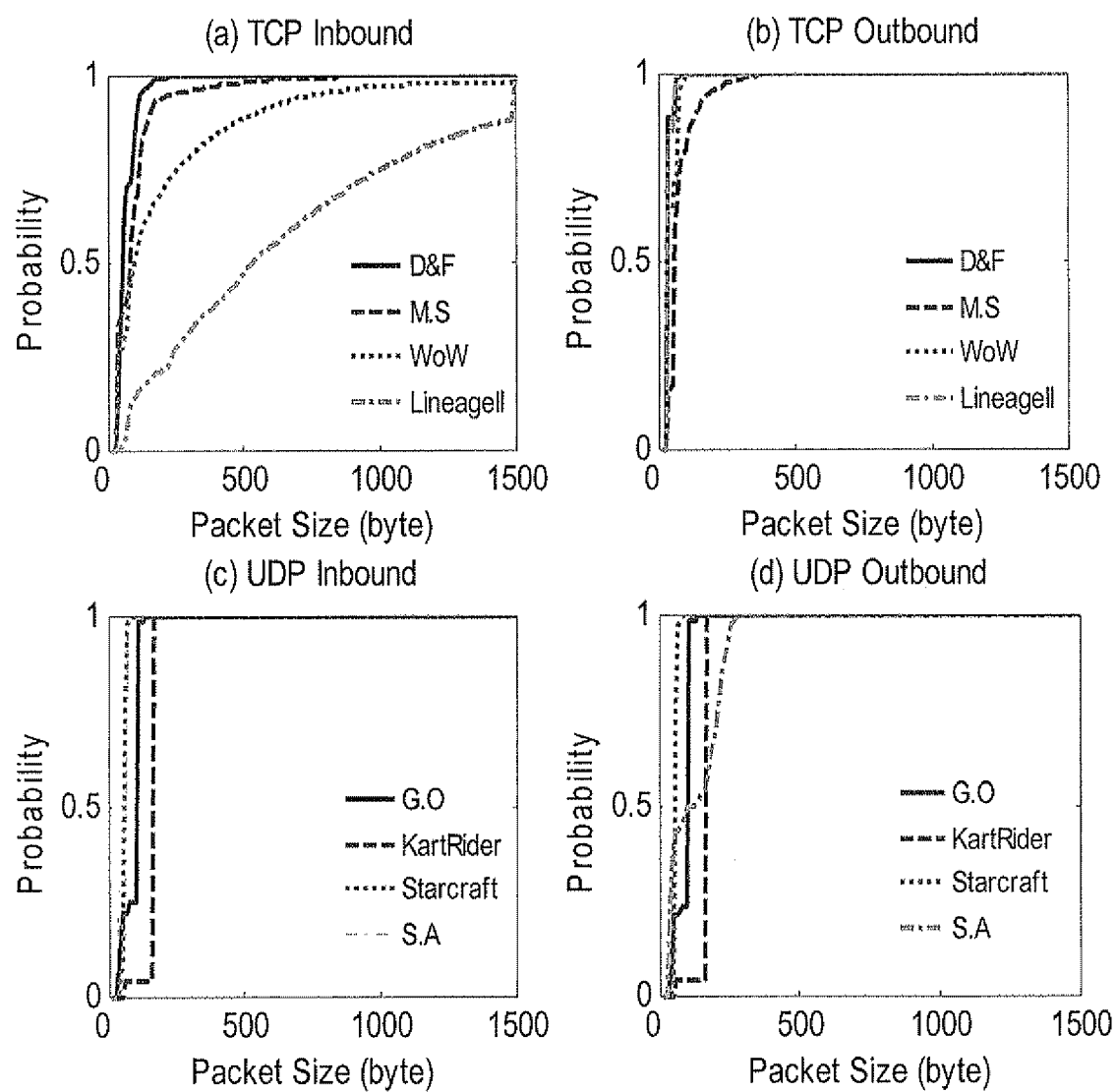
FIG. 1 shows packet size distribution of applications represented in table 1.

The aforementioned objects, characteristics and advantages of the invention are described more fully hereinafter with reference to the accompanying drawings so that those skilled in the art are able to perform the technical ideas of the invention easily according to them. In explaining the invention, detailed description is omitted when the detailed description regarding the relating prior art distracts the point of the invention. The desirable exemplary embodiments are provided hereinafter with reference to the accompanying drawings.

First, the inventors analyzed popular games in Korea to find out appropriate statistical characteristics for classifying traffic. The statistical characteristics of game applications are provided here from the aspects of (1) packet size distribution, (2) bytes per second (BPS), (3) packets per second (PPS), (4) correlations of packet size distribution (5) overall statistics of packet sizes.

The game applications used for inventors to find out statistical characteristics in transport layer are Gundam Online (G.O), KartRider, Starcraft, Sudden Attack (S.A); Dungeon & Fighter (D&F), Maple Story (M.S), World of Warcraft (WoW), and LineageII. The following table shows the types, structures (or communication models), protocol, known-ports of the above game applications. The game applications are classified in their types as First Person Shooting (FPS) game, Racing game, Real-time Strategy (RTS) game and Massive Multiplayer Online Role Playing Game (MMORPG).

| Application | Type | Structure | Protocol | Known Port(s) |
|---|---|---|---|---|
| G.O | FPS | P2P-Full mesh | UDP | 3001 |
| KartRider | Racing | P2P-Full mesh | UDP | N/A |
| Starcraft | RTS | P2P-Full mesh | UDP | 6112 |
| S.A | FPS | P2P-Hybrid | UDP | 27888 |
| D&F | MMORPG | C&S | TCP | 10001-10052 |
| M.S | MMORPG | C&S | TCP | 8585-8587 |
| WoW | MMORPG | C&S | TCP | 3724 |
| LineageII | MMORPG | C&S | TCP | 7777 |

The game applications use two communication models such as client and server (C&S) model and peer to peer (P2P) model. P2P model may be divided again into full mesh model and hybrid model. A peer in the full mesh model communicates with all other peers. When game applications adopt these models, some applications use the known ports while the others do not use the known ports. The port numbers of the KartRider in the inventors' experiment are not entirely known since they are allotted randomly. The hybrid model means that a certain peer is a server and the others communicate with the server. On that point, hybrid model is similar to C&S model, but IP addresses in the server side are much more dynamic than those in C&S model. In addition, the sever can be a client in hybrid model sometimes. Sudden Attack uses hybrid model and known port numbers. In case of C&S model, server addresses are always static. In contrast to P2P based applications, all of our C&S based reference applications use known port numbers and some attractive port numbers such as '7777' are shared in some applications. For example, the port number '7777' is used by LineageII, Napster and Oracle application server.

We collected data at border router within our campus network with a capture system based network processor. Our capture system supports 1 gigabyte per second without any loss of packets. The average use of our campus network is approximately 120 megabytes per second. In order to collect reference packets, we first collected IP address based traffic by fulfilling these applications in hosts several times for 30 minutes. We did not collect packets of full length. In order to verify the accuracy of the classification, we collected TCP/IP headers and 96 bytes packet including a certain part of user payload data.

FIG. 1 illustrates a cumulative distribution function (CDF) showing packet size distribution. When we present these distributions, we divide 1,500 bytes of the maximum transfer unit (MTU) in IP layer by 150 bins. For C&S model, the average inbound packet size from the server to the client is always bigger than the average out bound packet size from the client to the server. It is hard to see a packet with 1500 bytes in outbound traffic except C&S inbound traffic, because most of packet sizes are placed within 500 bytes. KartRider uses only 161, 56 and 171 bytes. Therefore the distribution is shape as a step function in both-directions.

Figure 2:
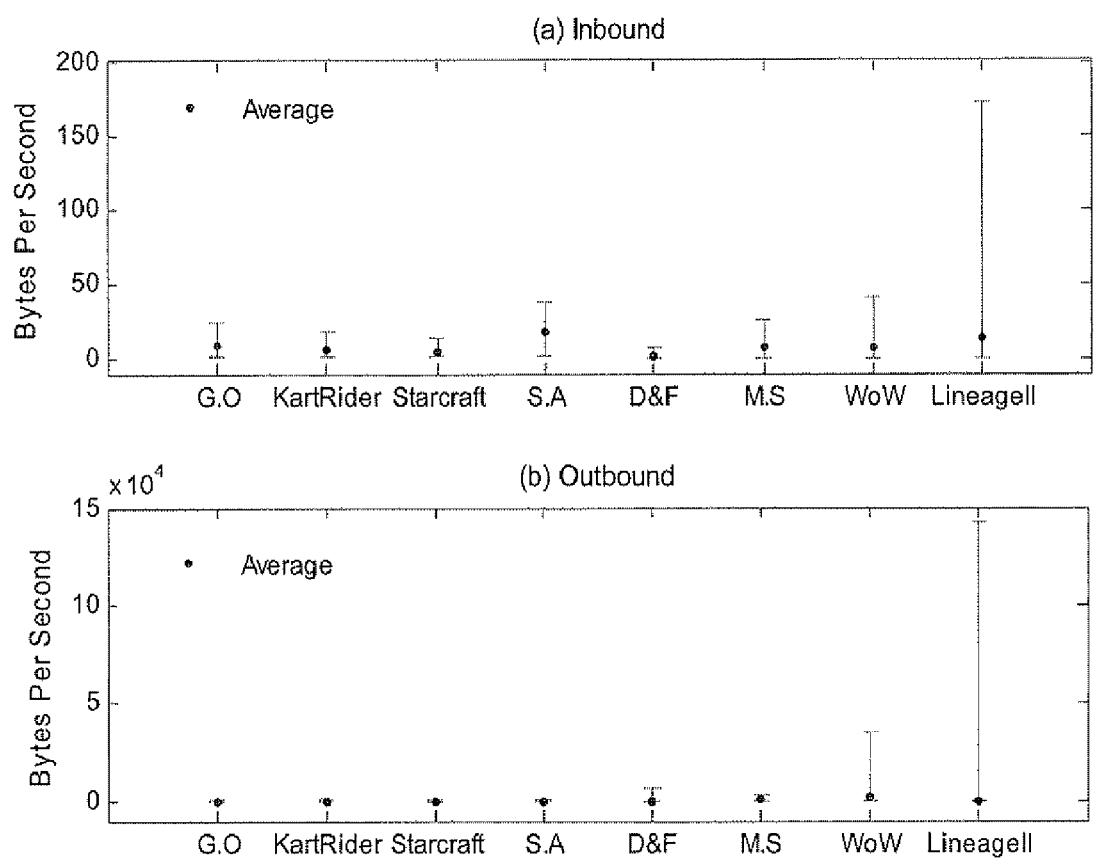
FIG. 2 illustrates bytes per second regarding inbound and outbound traffic of applications represented in table 1.

FIG. 2 illustrates bytes per second (BPS) regarding inbound and outbound traffic. We understand from FIG. 2 that UDP based game applications using P2P model have a symmetrical traffic pattern. That is, the volume of inbound and outbound traffic is very similar. However, for TCP, inbound and outbound traffic is asymmetrical. The inbound traffic originated from the server is always bigger than the inbound traffic originated from the client.

Figure 3:
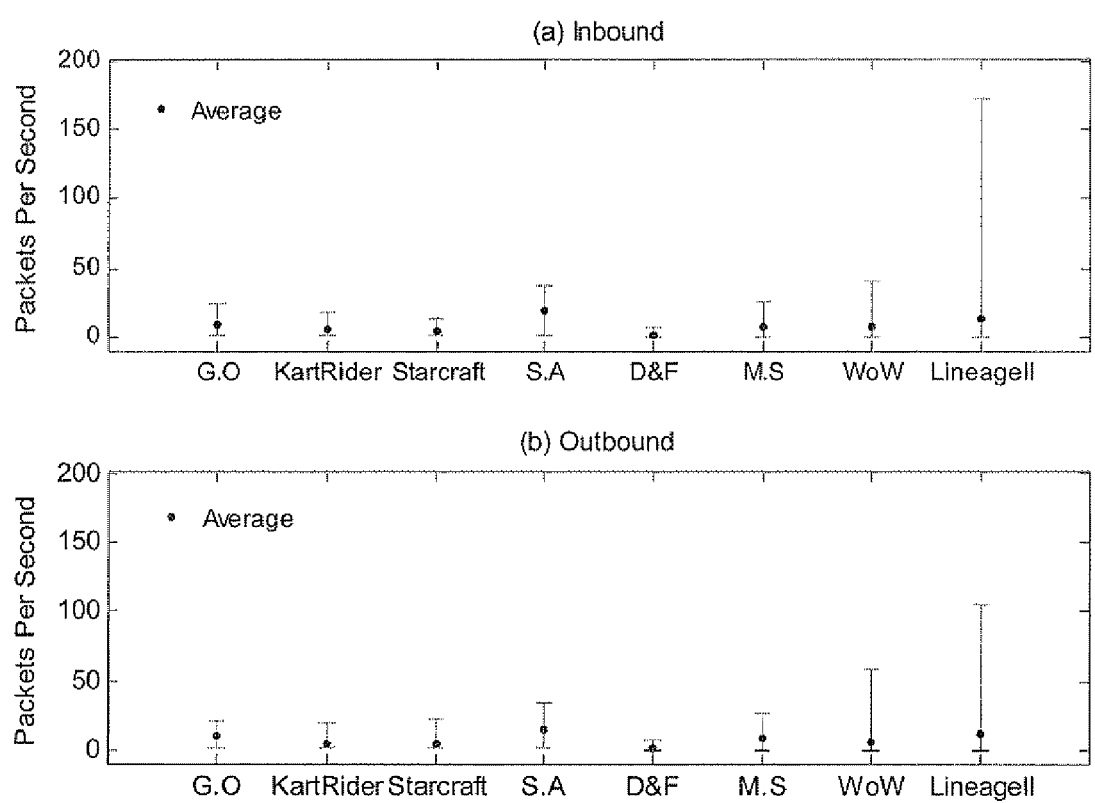
FIG. 3 illustrates packets per second regarding inbound and outbound traffic of applications represented in table 1.

FIG. 3 illustrates packets per second (PPS) for inbound and outbound traffic. We understand from FIG. 3 that PPS's of the inbound and outbound traffic in UDP and TCP based game applications are very similar. The average PPS is smaller than 20. For one connection, the PPS and BPS of the UDP based applications are smaller than those of the TCP based applications. In order to obtain total PPS and BPS, the number of the simultaneous game hosts must be multiplied for P2P based applications.

Figure 4:
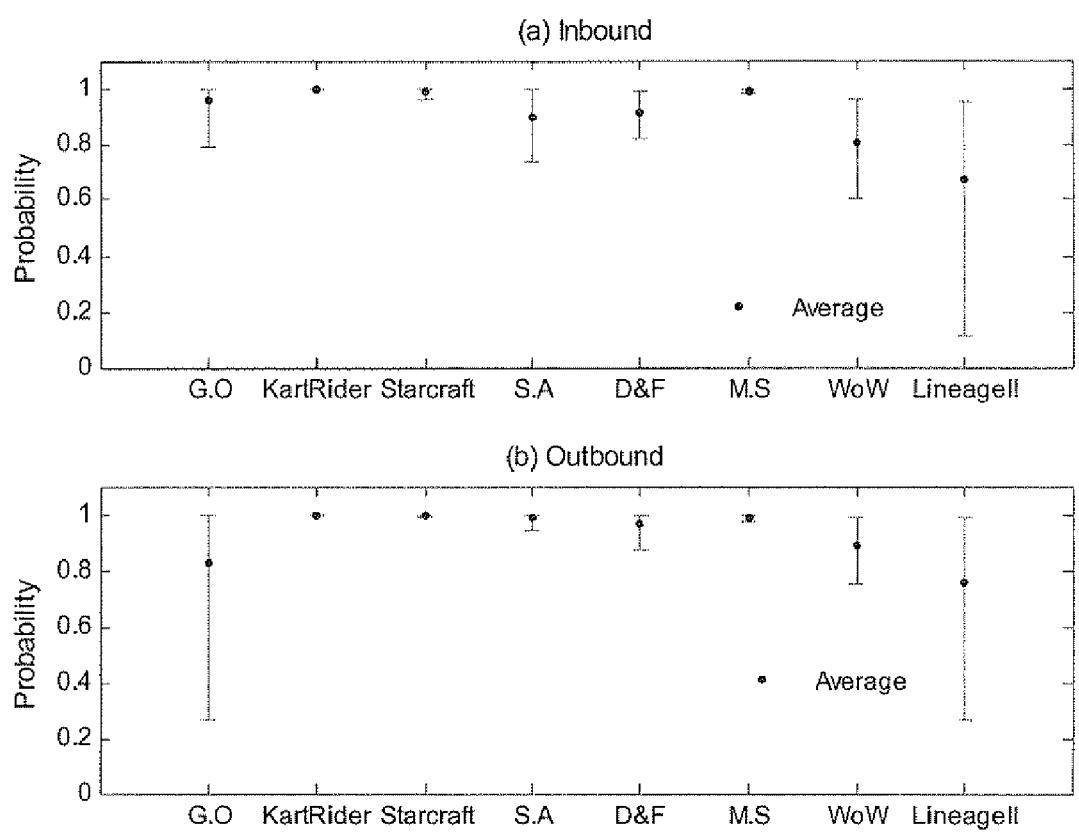
FIG. 4 illustrates correlation coefficients of applications represented in table 1.

Some characteristics of traffic in game applications are represented so far from the aspects of packet sizes, PPS and BPS. Also, the correlation of the packet size distribution between flows in the same applications is examined. FIG. 4 illustrates correlation coefficients. We understand that P2P based applications have very big correlation coefficients up to 1. This means that the packet size distribution in the same applications is almost identical for any flows. However, C&S based applications have lower correlation coefficients as compared with P2P applications.

Further, we examined cross correlation between different applications. The packet size distributions of some applications are very similar to each other and have high correlation coefficients between these applications. This high correlation coefficients disable classifying some applications. Therefore we classify these applications by using other statistical characteristics such as the smallest packet size, the biggest packet size and set of the most frequent packet sizes (mode set of packet size). For example, D.F and S.A are very similar in their distributions, on the other hand, are very different in the smallest packet size, the biggest packet size and mode set of packet size. In this specification, we define a mode set of packet size as a set of packet sizes comprising the first frequent packet size (Mode 1) to the third frequent packet size (Mode 3), as follows:

$$\text{mode set of packet size} = \{\text{Mode 1, Mode 2, Mode 3}\} \quad (1)$$

Figure 5:
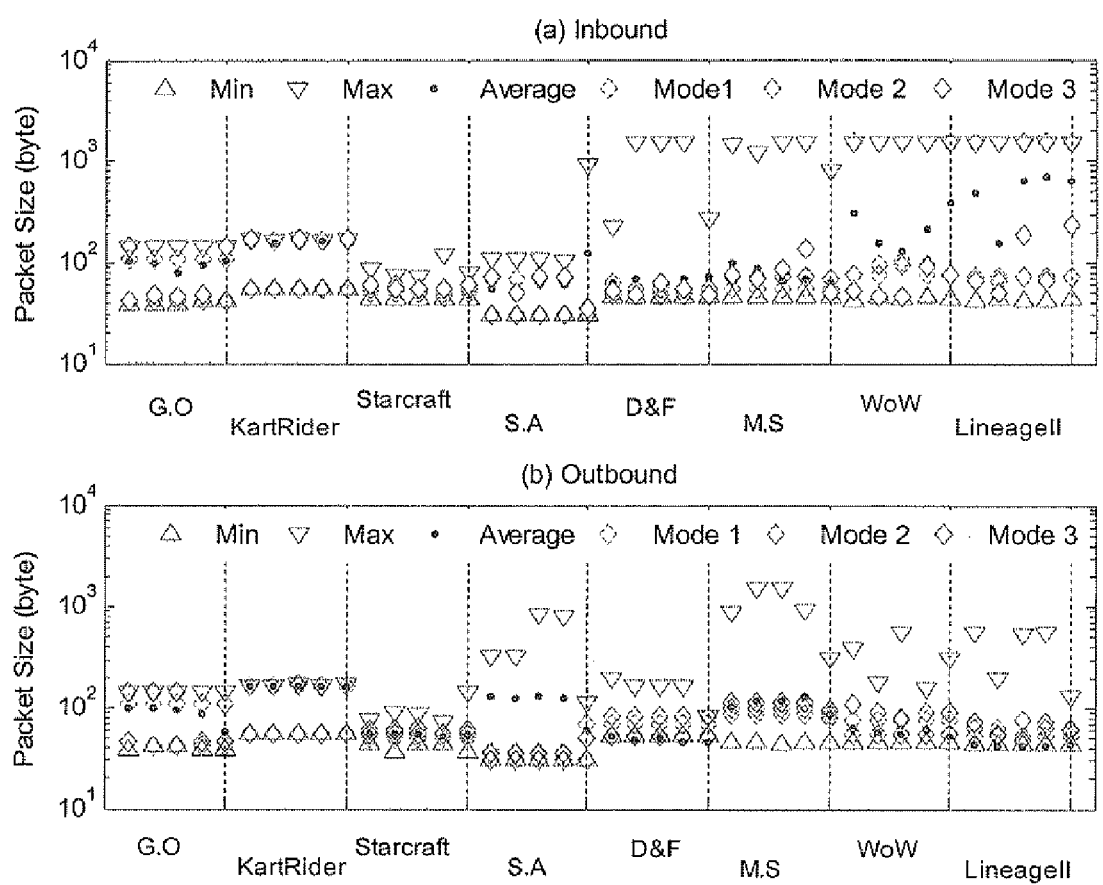
FIG. 5 illustrates overall statistics of packet sizes from aspects of the smallest packet size, the biggest packet size, the average packet size and the mode set of packet size regarding applications represented in table 1.

FIG. 5 illustrates the overall statistical data of packet sizes from the aspects of the smallest packet size, the biggest packet size, the average packet size and a mode set of packet size. For TCP based applications, the packet length of 40 bytes is not included in the mode set of packet size since it is used for TCP acknowledgement. If we include this size in the mode set of packet size, the first packet size would be 40 bytes in most of TCP based applications. As shown in FIG. 5, UDP based applications have almost identical values in the smallest packet size, the biggest packet size and the mode set of packet size. Especially, the order of modes in the mode set of packet size in KartRider is identical for all flows. For instance, the size of Mode 1 is 167, that of Mode 2 is 56 and that of Mode 3 is 171. Although Mode 3 is not appeared in some flows sometimes, the average packet size for every KartRider flow is almost 163. This means that some applications like KartRider can be classified easily by using the smallest packet size, the biggest packet size, a mode set of packet size and the average packet size. The degree of change of these statistical data is low in UDP based applications. Although the biggest size of TCP based applications is very dynamic for outbound, that of most of outbound flows is almost 1,500 bytes. From this point of view, S.A shows characteristics similar to TCP based applications because it uses hybrid communication model.

Until now, we have discussed the characteristics of game applications from the aspects of packet sizes, BPS, PPS and correlation. The smallest packet size, the biggest packet size, the average packet size, the mode set of packet size and the correlation between the packet size distributions have deterministic characteristics in game applications. Therefore, these characteristics can be used for classifying game applications as explained below.

Figure 6:
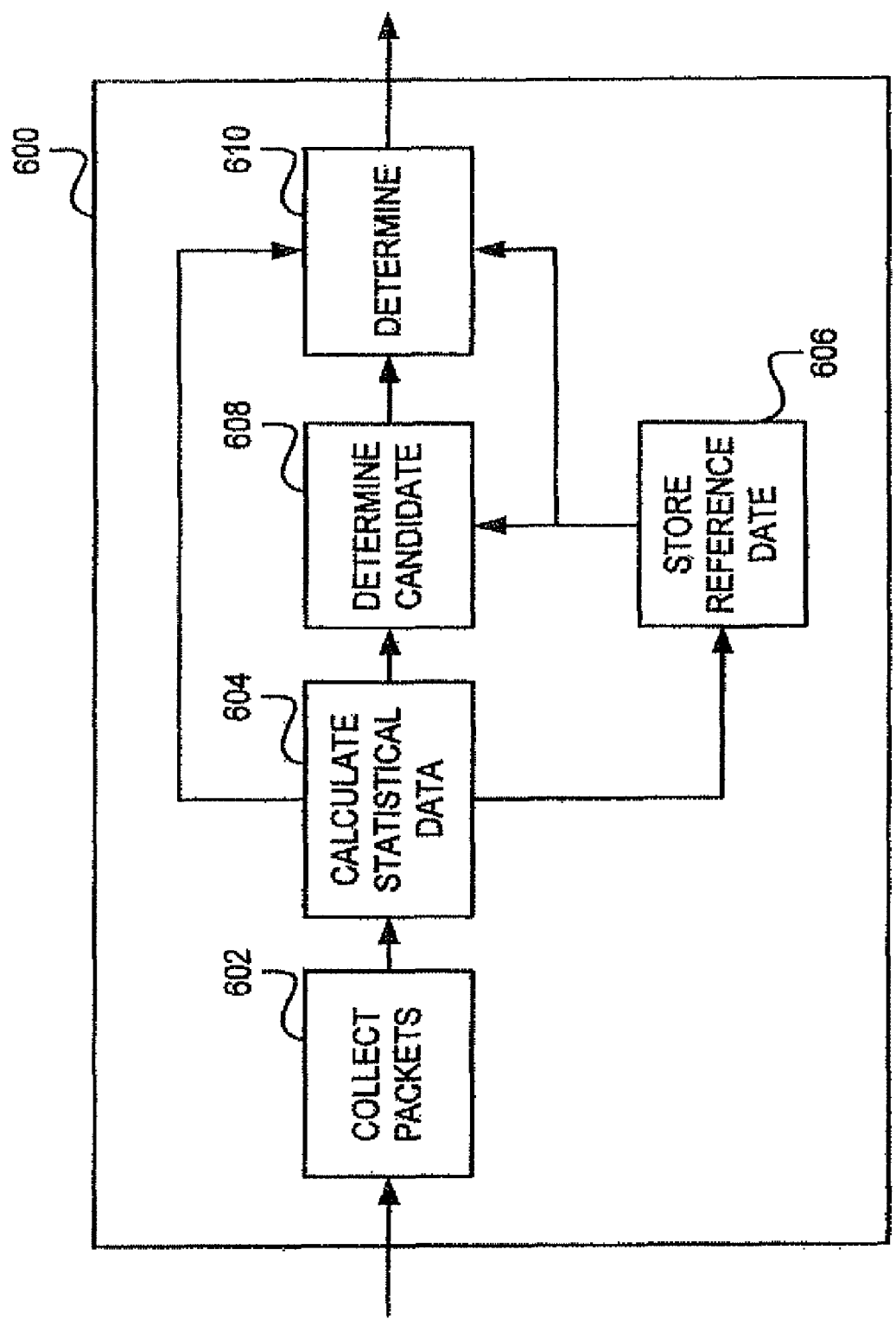
FIG. 6 is a schematic diagram of the apparatus for classifying traffic according to an exemplary embodiment of the present invention.

FIG. 6 is a schematic diagram of the apparatus for classifying traffic according to an exemplary embodiment of the present invention. As shown, the apparatus for classifying traffic includes a packet collection section 602, a statistical data calculation section 604, a reference data storage section 606, a candidate application determination section 608 and a final application determination section 610.

The packet collection section 602 collects packets for each flow. The packet collection section 602 measures by packet unit in order to identify applications and collects packets including IP and TCP/UDP header information. Each flow is defined by departure/destination IP addresses, departure/destination port numbers and protocol number. Generally, there are one flow in the input direction and one flow in the output direction for a network connection in using an application.

The statistical data calculation section 604 calculates packets per second, bytes per second, the smallest packet size, the biggest packet size, the average packet size, packet size distribution, distributions of packet arrival time and mode of packet size for the packets collected in the packet collection section 602. When calculating the distribution of packet sizes, for example, the unit of packet size is set to 10 bytes and the distribution is determined for 0 to 1,500 bytes. When calculating the distribution of packet arrival time, for example, the unit of time is set to 50 ms, the distribution is determined for 0 to 1 second and the packet arrival times over 1 second is set to 1 second. A mode set of packet size is a set of the most frequently used packet sizes for a flow. We use the first to third modes in an exemplary embodiment of the present invention. Therefore, the mode set is defined as {Mode 1, Mode 2, Mode 3} when the first mode is Mode 1, the second is Mode 2 and the third is Mode 3 for a flow.

The reference data storage section 606 collects the statistical data of the identification potential applications through the statistical data calculation section 604 and storage them as application reference data in order to identify applications. The reference data storage section 606 defines a set for each of packets per second, bytes per second, the smallest packet size, the biggest packet size, the average packet size, the distribution of packet sizes, and the distribution of packet arrival times of the identification potential application. Each set has two elements. This is because statistical data are different between input direction and output direction for an application. The most frequently used value for each flow is taken as reference statistical data for an application.

The reference data storage section 606 also collects mode sets of packet size and stores them. The mode sets of packet size include, for example, the first to fifth modes. That is, the reference data for the mode set is defined as {Mode 1, Mode 2, Mode 3, Mode 4, Mode 5} when the first mode is Mode 1, the second is Mode 2, the third is Mode 3, the fourth is Mode 4 and the fifth is Mode 5 for a flow.

The candidate application determination section 608 determines candidate applications by comparing at least one of the smallest packet size, the biggest packet size and the average packet size for the packets collected in the packet collection section 602, with the reference data stored in the reference data storage section 606.

The final application determination section 610 identifies the application of a flow by comparing the reference data of candidate applications determined in the candidate application determination section 608 with the statistical data outputted in the statistical data calculation section 604 for the packets of the flow collected in the packet collection section 602.

The final application determination section 610 can identify the application for a flow by comparing the mode set of the packet size for the packets collected in the packet collection section 602 with the reference data from the reference data storage section 606, and determining which application has elements in the same order and of equal to and more than a predetermined number. For example, when the mode set for each flow has three elements and the reference data of the mode set for an application has five elements, if three elements are identical between the above two sets and the elements are in the same order, the flow is identified as the application.

Meanwhile, if it is not able to identify application for a flow through a method using a mode set, the final application determination section 610 can identify the flow as the application by calculating a correlation coefficient between the distribution of packet sizes for the collected packets and the reference data of the distribution for the potential applications.

Figure 7:
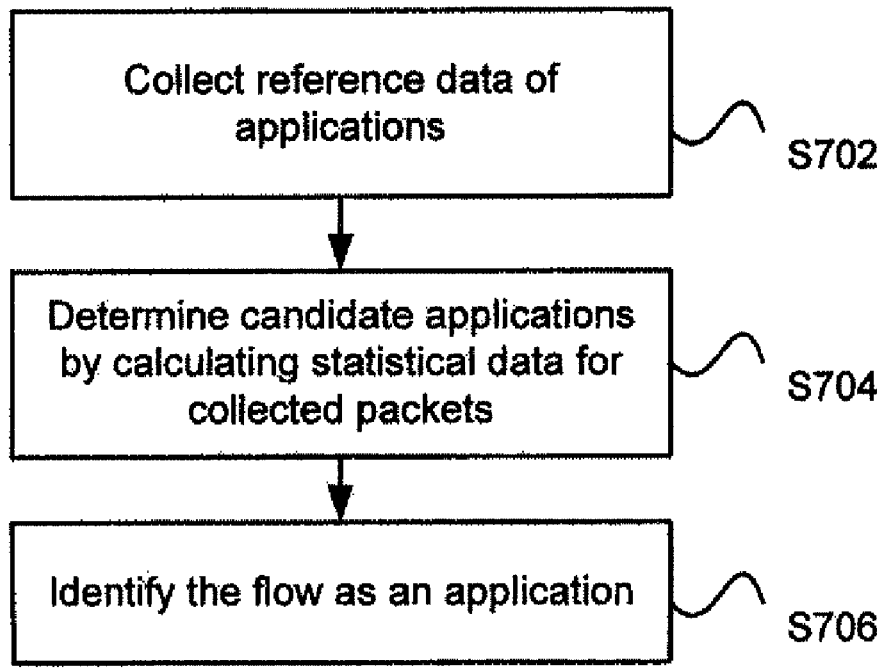
FIG. 7 is a flowchart of a method for classifying traffic according to an exemplary embodiment of the present invention.

FIG. 7 is a flowchart of a method for classifying traffic according to an exemplary embodiment of the present invention.

First, the reference data of potential applications are collected and stored (S702). The reference date storage section 606 stores packets per second, bytes per second, the smallest packet size, the biggest packet size, the average packet size, the packet size distribution, the distributions of packet arrival time and the mode set of packet size of the potential applications as the reference data of the potential applications.

Next, the candidate applications are determined by using a part of the reference data (S704). In order to accomplish this, at least one of the smallest packet size, the biggest packet size and the average packet size of the collected packets for a flow can be compared with the corresponding reference data of the potential applications. When determining the candidate applications, the PPS or BPS for the collected packets can also be compared with the reference data of the potential applications, and then a potential application is excluded from the candidate applications if the PPS or BPS is beyond a tolerance.

Finally, the application is determined for the collected packets by comparing the statistical data of the collected packets with the reference data of each candidate application (S706).

Figure 8:
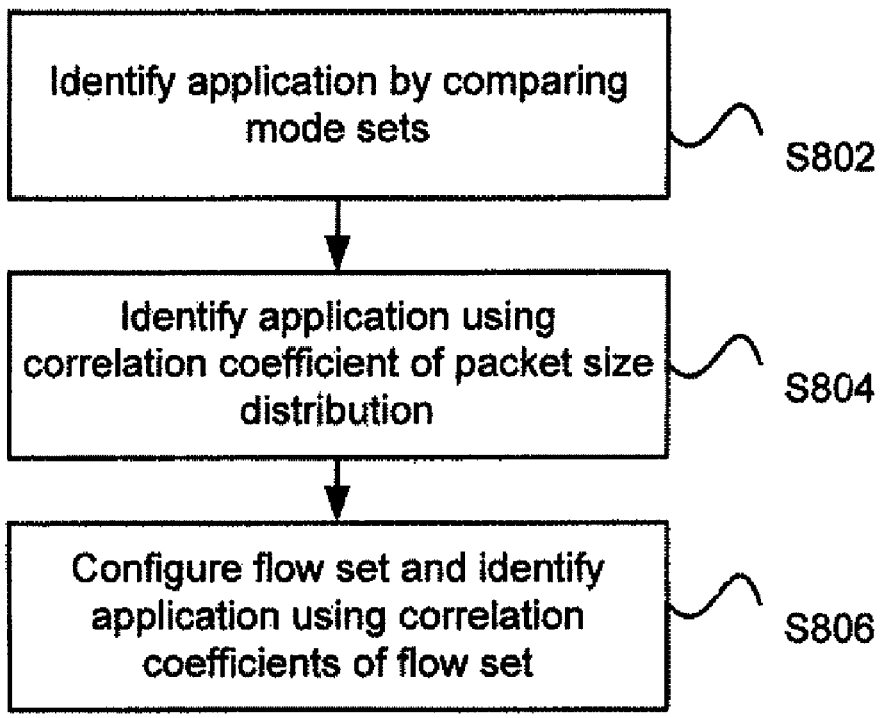
FIG. 8 is a detailed flowchart of application identification step 706 of FIG. 7.

FIG. 8 is a detailed flowchart of the step S706 of FIG. 7.

First, the mode set of packet size for the collected packets is compared with the reference data of the mode set for the candidate applications, and the flow of the collected packets is identified as the application which has identical elements in the same order of equal to or more than a predetermined number (S802). In other words, if the mode set for the flow and the reference data of the mode set for an application have, for example, three identical elements in the same order, the correlation coefficient is set as 1 and the identifying is completed If the number of applications which have identical elements in the same order with the number of the identical elements being equal to or more than two, the reference data of the distribution of packet sizes for the corresponding candidate applications are collected, the correlation coefficients between the distribution of packet sizes for the collected packets and the reference data for the corresponding candidate applications are calculated, and the flow of the collected packets is identified as the application which has the biggest correlation coefficient.

If none of the candidate applications have identical elements in the same order with the number of the identical elements being equal to or more than two, the correlation coefficients between the distribution of packet sizes for the collected packets and the reference data for the candidate applications are calculated, and the flow of the collected packets is determined as the application which has correlation coefficient of the biggest value and over 0.8 (S804). The correlation coefficient is calculated as follows.

$$\rho = \frac{E[(S_i - \mu_i)(R_j - \mu_j)]}{\sqrt{\text{Var}(S_i) \cdot \text{Var}(R_j)}} \quad (2)$$

Rj is a random variable for the reference distribution of application j, Si is a random variable for the sampled distribution of flow I, and µ1 and µ2 are the average values of Rj and Si, respectively.

If the application of flows can not be identified according to the steps S802 and S804, a flow set is configured with flows which are identical in at least one of key values of {departure address, departure port number} and {arrival address, arrival port number}, the correlation coefficients between the reference data of the packet size distribution for all the potential applications and the packet size distribution for all the flows in the flow set are calculated, all the flows in the flow set are determined as the application which has the biggest correlation coefficient with a flow in the flow set (S806).

For example, if the key values for flow A are {1.0.0.1, 100} and {2.0.0.2, 200}, and if the key values for flow B are {3.0.0.3, 300} and {1.0.0.1, 100}, flows A and B have an identical key value of {1.0.0.1, 100}, and thus they can be configured as a flow set. And if candidate applications are C and D, the correlation coefficients of flow A with applications C and D are 0.3 and 0.4, respectively, the correlation coefficients of flow B with applications C and D are 0.5 and 0.6, respectively, the biggest correlation coefficient is the correlation coefficient of flow B with application D, which is 0.6. Therefore both of flow A and B are identified as application D.

A method of the present invention may be embodied as a program and can be stored in recording medium (CD ROM, RAM, ROM, Floppy Disc, Hard Disc, Magneto-Optical Disc) which is readable by computers. We omit further explanation because this process can be performed by those skilled in the art easily.

Although exemplary embodiments of the present invention have been described for illustrative purposes, those skilled in the art will appreciate that various modifications, additions and substitutions are possible, without departing from the scope and spirit of the invention as defined in the accompanying claims.

What is claimed is:

1. An apparatus for classifying traffic at transport layer, comprising:
   a packet collection section for collecting packets of a flow;
   a reference data storage section for storing reference data regarding smallest packet size, biggest packet size, average packet size and mode set of packet size for potential applications;
   a candidate application determination section for determining candidate applications by comparing at least one of smallest packet size, biggest packet size and average packet size of packets collected in the packet collection section with the corresponding reference data for the potential applications stored in the reference data storage section; and
   a final application determination section for comparing mode set of packet size for the collected packets with the corresponding reference data of the candidate applications to identify the flow as an application which has identical elements in the same order, the number of the identical elements being equal to or more than a predetermined number.

2. The apparatus of claim 1, wherein the apparatus is configured to:
   collect reference data regarding packet size distributions of the candidate applications if the flow is identified as more than one application;
   calculate correlation coefficients between packet size distribution of the collected packets and those of the identified applications; and
   identify the flow as an application which has the biggest correlation coefficient.

3. The apparatus of claim 1, wherein the apparatus is configured to collect reference data regarding smallest packet size, biggest packet size, average packet size and mode set of packet size for the potential applications.

4. The apparatus of claim 3, wherein the reference data is defined as most frequent value for input and output directions, respectively.

5. The apparatus of claim 3, wherein the reference data of the mode set for the potential applications has equal to or more than elements than the mode set for the collected packets.

6. The apparatus of claim 1, wherein the apparatus is configured to:
collect reference data regarding packets per second (PPS) and bytes per second (BPS) for the potential applications; and
compare PPS and BPS for the collected packets with PPS and BPS for the potential applications to exclude a potential application from the candidate applications if the difference of PPS or BPS between the potential application and the collected packets is beyond a predetermined value.

7. The apparatus of claim 1, wherein the apparatus is configured to:
collect reference data regarding packet size distribution of the potential applications;
calculate correlation coefficients between the packet size distribution for the collected packets and those of the potential applications; and
identify the flow as a potential application which has the biggest correlation coefficient, wherein the biggest correlation coefficient is equal to or more than a predetermined value.

8. The apparatus of claim 7, wherein the packet size distribution is collected by unit of a predetermined packet size.

9. The apparatus of claim 1, wherein the apparatus is configured to:
configure a flow set with flows of which at least one of elements {departure address, departure port number} and {arrival address, arrival port number} is identical; and
identify all flows of the flow set as a potential application which has the biggest correlation coefficient between the potential applications and the flows of the flow set.

10. An apparatus for classifying traffic at transport layer, comprising:
a packet collection section for collecting packets of a flow;
a reference data storage section for storing reference data regarding mode set of packet size for candidate applications; and
an application determination section for comparing mode set of packet size for the collected packets with the reference data of the candidate applications to identify the flow as an application which has identical elements in the same order, the number of the identical elements being equal to or more than a predetermined number.

11. The apparatus of claim 10, wherein the apparatus is configured to:
collect reference data regarding packet size distributions of the candidate applications if the flow is identified as more than one application;
calculate correlation coefficients between packet size distribution of the collected packets and those of the identified applications; and
identify the flow as an application which has the biggest correlation coefficient.

12. The apparatus of claim 10, wherein the apparatus is configured to:
collect reference data regarding smallest packet size, biggest packet size, average packet size, PPS and BPS for the candidate applications; and
compare at least one of smallest packet size, biggest packet size, average packet size, PPS and BPS for the flow with the corresponding reference data for the candidate applications to exclude a candidate application if the difference between the candidate application and the flow is beyond a predetermined value.

13. An apparatus for classifying traffic at transport layer, comprising:
a packet collection section for collecting packets of a flow;
a reference data storage section for storing reference data regarding packet size distribution of candidate applications;
an application determination section for calculating correlation coefficients between packet size distribution for the collected packets and packet size distributions of the candidate applications to identify the flow as an application which has the biggest correlation coefficient.

14. The apparatus of claim 13, wherein the apparatus is configured to:
collect reference data regarding smallest packet size, biggest packet size, the average packet size of the candidate applications; and
compare at least one of smallest packet size, biggest packet size and average packet size for the flow with the corresponding reference data for the candidate applications to exclude a candidate application if the difference between the candidate application and the flow is beyond a predetermined value.

15. The apparatus of claim 13, wherein the packet size distribution is collected by unit of a predetermined packet size.

16. The apparatus of claim 13, wherein the apparatus is configured to:
configure a flow set with flows of which at least one of elements {departure address, departure port number} and {arrival address, arrival port number} is identical; and
identify all flows of the flow set as a application which has the biggest correlation coefficient between the candidate applications and the flows of the flow set.

* * * * *

UNITED STATES PATENT AND TRADEMARK OFFICE
CERTIFICATE OF CORRECTION

| | | |
|---|---|---|
| PATENT NO. | : 7,974,214 B2 | Page 1 of 1 |
| APPLICATION NO. | : 12/423578 | |
| DATED | : July 5, 2011 | |
| INVENTOR(S) | : Young Tae Han | |

It is certified that error appears in the above-identified patent and that said Letters Patent is hereby corrected as shown below:

First Page, Column 1, Assignee, Line 1, after "Industrial" insert -- Cooperation --

Signed and Sealed this
Fifteenth Day of November, 2011

David J. Kappos
*Director of the United States Patent and Trademark Office*